United States Patent
Bahl et al.

[19]

[11] Patent Number: 5,995,931
[45] Date of Patent: Nov. 30, 1999

[54] METHOD FOR MODELING AND RECOGNIZING SPEECH INCLUDING WORD LIAISONS

[75] Inventors: Lalit Rai Bahl, Amawalk; Steven Vincent De Gennaro, Pawling, both of N.Y.; Peter Vincent deSouza, San Jose, Calif.; Edward Adam Epstein, Putnam Valley, N.Y.; Jean-Michel Le Roux, Elmsford, N.Y.; Burn Lewin Lewis, Ossining, N.Y.; Claire Waast-Richard, Paris, France

[73] Assignee: International Business Machines Corporation, Armonk, N.Y.

[21] Appl. No.: 09/253,987

[22] Filed: Feb. 22, 1999

Related U.S. Application Data

[63] Continuation of application No. 08/662,407, Jun. 12, 1996, Pat. No. 5,875,426.

[51] Int. Cl.⁶ ...................................................... G10L 7/08
[52] U.S. Cl. .......................................... 704/257; 704/254
[58] Field of Search ................................... 704/244, 251, 704/252, 254–257

[56] References Cited

U.S. PATENT DOCUMENTS

| | | | |
|---|---|---|---|
| 4,349,700 | 9/1982 | Pirz et al. | 704/241 |
| 4,980,918 | 12/1990 | Bahl et al. | 704/240 |
| 5,875,426 | 2/1999 | Bahl et al. | 704/255 |

*Primary Examiner*—David R. Hudspeth
*Assistant Examiner*—Donald L. Storm
*Attorney, Agent, or Firm*—F.Chau & Associates, LLP

[57] ABSTRACT

A system and method for recognizing spoken liaisoned words. The method and system identify each word in the vocabulary as a liaison generator and/or liaison receptor. If the word is a liaison receptor, and if the word is preceded by a liaison generator, the most probable recognition result for the word will be the liaison generated by the preceding word plus the word. Liaisons are identified on an immediately preceding word in accordance with rules in a language. A word that ends with an unpronounced consonant phoneme, when followed by a word beginning with a consonant phoneme, and ends with a pronounced phoneme, when followed by a word with a vowel-like phoneme, causes a match list for the current word to be amended with words having liaisons added at their beginnings.

14 Claims, 3 Drawing Sheets ived, 1996, now U.S. Pat. No. 5,875,426.

METHOD FOR MODELING AND RECOGNIZING SPEECH INCLUDING WORD LIAISONS

CROSS REFERENCE TO RELATED APPLICATION

This is a continuation of application Ser. No. 08/662,407 filed Jun. 12, 1996, now U.S. Pat. No. 5,875,426.

FIELD OF THE INVENTION

The invention relates to automatic speech recognition, and in particular to a method for dealing with changes in word pronunciation owing to word liaisons.

BACKGROUND OF THE INVENTION

In some languages, such as French, there is a phenomenon occurring at word junctions that can cause significant changes in pronunciation. This phenomenon is a cross-word co-articulation, referred to herein as "liaison", that is characterized by the optional insertion of a phoneme between two successive words. It occurs when a first word ending in a consonant that typically is not pronounced is followed by a second word beginning with a vowel-like sound. In many contexts, the speaker is free to either pronounce the liaison or not, and is also free to either pause between liaisonable words or not. There is, however, a natural tendency on the part of the many speakers to carry the liaison over into the next word. Optional pronunciations, however, cause ambiguities that are difficult for prior speech systems to resolve.

One solution to this problem may be the generation of a set of rules for each possible occurrence of liaison in the language. A complete set of rules for liaisons is impractical, however, as there are many exceptions and dialectal variations. For example, the French sentence "les deux à la fois" could be pronounced either "les deux à la fois" or "les deux Zá la fois". In our terminology, we say that "deux" generates a Z-liaison and "á" accepts a liaison. To our knowledge, no prior system has allowed the insertion of liaisons. Thus, a need has arisen for a speech recognition system that can efficiently handle this common speech characteristic.

SUMMARY OF THE INVENTION

The invention is a system and method of recognizing speech, comprising: providing a vocabulary comprising a plurality of words; designating as liaison generators all words in the vocabulary that are, within the rules (phonetic, and otherwise) of the language, capable of generating a liaison phoneme with a following word in a spoken utterance, and designating as liaison receivers all words in the vocabulary that are, within the rules of the language, capable of receiving a liaison phoneme from a preceding word in a spoken utterance; inputting a string of spoken utterances to be recognized; recognizing a pronunciation of the generator and receptor words if the speaker of the utterances adds the liaison phoneme between the generator and receptor words.

DETAILED DESCRIPTION OF THE PREFERRED EMBODIMENTS

Figure 1:
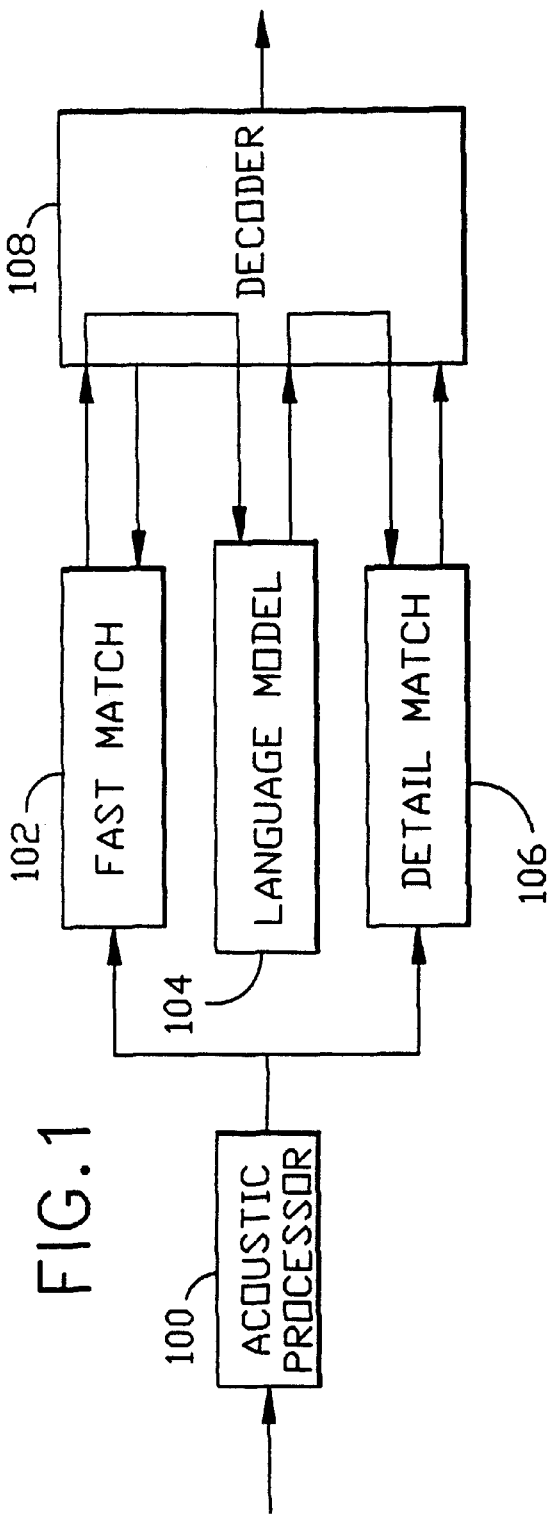
FIG. 1 is a block diagram of a system in accordance with the invention.

Liaison occurs when a consonant at the end of a word, orthographically present but not pronounced in the isolated word, is followed by a word beginning with a vowel-like sound. In such cases, an optional phoneme might be inserted by the speaker in front of the second word.

As shown in Table 1, the French language includes six different phonemes that can be generated when a liaison occurs: Z, N, R, T, P, and G. The word endings causing these phonemes to be inserted, along with examples of occurrence, are also shown in Table 1. The G and P liaisons are rare.

Table 2 describes a possible first level of liaison-generating rules. The rule in Table 2 is as follows:

if a word ends with one of several non-pronounced consonants, and if the following word begins with a vowel-like sound, then a liaison phoneme corresponding to the consonant can be inserted in front of the second word.

As the liaisons strongly depend on a complex interaction between orthography, syntax, semantics and other factors, we need at least syntactic information to predict liaison realization with better accuracy. Up to now, current speech recognition systems do not use such information.

Table 3 gives some examples of word constraints which can be applied during recognition for better liaison prediction. Those skilled in the art will be able to derive additional rules with reference to the examples given. Table 3 considers the characteristics of the following words in a sequence: a left left word (i.e., a word two positions to the left of the current word); a left word ending with a liaison generating consonant (broken down by grammatical class); the current word, beginning with a vowel-like sound (also broken down by grammatical class); and a right word. For each line of Table 3, if all the word constraints are realized, then a liaison is possible between the left word and the current word. For example, the first line can be understood as follows: If the current word is avoir and the left word is the preposition après then a liaison is possible between après and avoir. The eighth line can be understood as follows: If the current word is an adjective and if the preceding word is a number, then a liaison is possible between these two words (for example, in trois inséparables amis—three inseparable friends—a liaison is possible between trois and inséparables). Hundreds of such rules can be written in French.

Coding of Liaison Information

In accordance with the invention, two types of liaison information are identified for each word in the vocabulary. Consequently, two flags can be set for each word, indicating the presence or absence of the two liaison characteristics. The first is a "generating liaison" flag, which specifies whether or not the word generates a liaison, and if so, which one. The second is an "accepting liaison" flag which specifies whether or not the word accepts a liaison at its beginning. The "accepting liaison" flag allows the handling of exception words which start with a vowel-like sound but which do not accept liaison, such as "les Handicapés". For static vocabularies, these flags can be generated by a semi-automatic method based on baseline rules (such as in Tables 2 and 3), database access and human verification.

The static vocabulary files are built separately, and only once for the system. For the words in this vocabulary, the liaison flags are hard coded into the vocabulary file and are obtained as follows: for each word of the vocabulary, consult a database which contains spelling, phonetic, grammatical and liaison information for a very large number of words. If the word is in the database, pick up the liaison flag attached to it. If the word is not in the database, baseline rules, such as the ones in Tables 2 and 3 are applied on this unknown word. Human verification is then performed on the list of unknown words, wherein a human analyst determines whether the setting of the liaison flag based on the baseline rules was correct. After human verification, the database is updated with the new list of words.

For dynamic vocabularies, the liaison flags are dynamically computed when the vocabularies are loaded by applying the baseline rules such as in Tables 2 and 3 to the lexemes. The dynamic vocabulary files are built "in-line", when needed. Up to now, these vocabularies were used for command or navigation tasks, as well as for the "addword" function, which allows the adding of words to a vocabulary. When one of these vocabularies is required according to what the user is asking for, the system loads the spellings needed, looks to their phonetic baseforms and computes the liaison flags by applying the baseline rules to the couple (spelling, baseform).

Liaison and Speech Recognition

In a speech recognition system, the liaisons must be handled optionally (i.e., the liaison can't be imposed as a requirement upon the speaker, since the use of liaison in the language is optional according to the speaker's speaking style) and guided by the acoustic signal itself. In the present invention, two acoustic matches are performed: a fast match and a detailed match.

Figure 2:
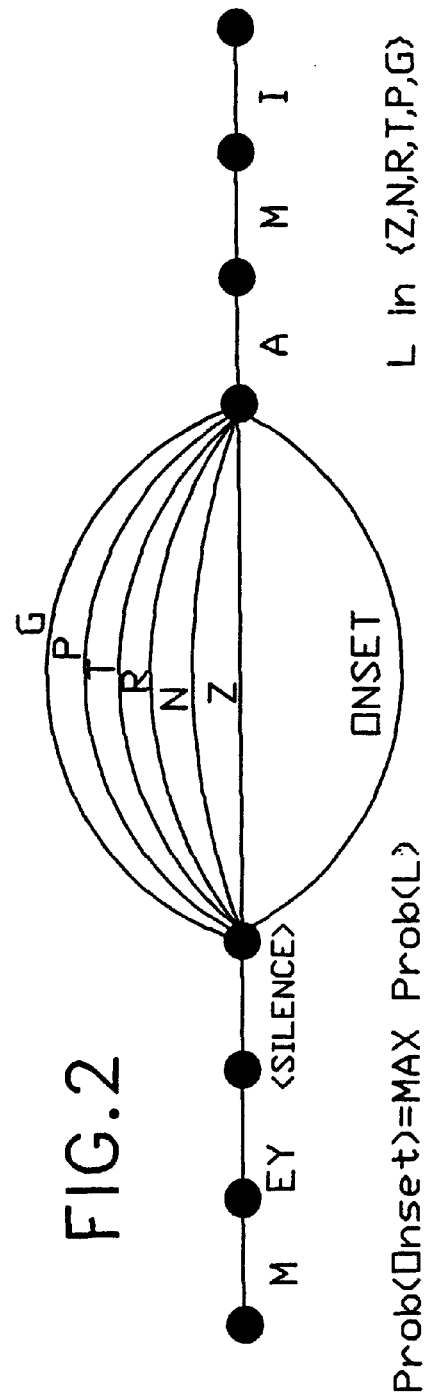
FIG. 2 is a Fast-Match Hidden Markov Modelling of the phrase "mes amis" in accordance with the invention.

The organization of one embodiment of a system in accordance with the invention is shown in FIG. 1. An acoustic processor 100 takes an input speech sequence, and generates a set of labels identifying each of a plurality of sequential segments of the speech sequence. A fast match processor 102 performs an acoustic fast match on the labels, which results in a list of acoustically reasonable candidate words selected from all words in the vocabulary (the fast match procedure is described in U.S. Pat. No. 4,718,094, incorporated herein by reference). If the current word being recognized includes an onset, the fast match performed on it will include a determination of the probability of each possible liaison at the beginning of that word. An onset is a Hidden Markov Model placed at the beginning of a word in order to model the transition between silence and the beginning of the word. For example, as illustrated in FIG. 2, if the current word being recognized is the French word "ami", that word is known to have an onset at the beginning. If a liaison phoneme was carried over from the previous word, the onset will have a high probability of being recognized as that liaison phoneme.

Returning to FIG. 1, the output of the fast match is provided to a decoder 108, which performs a supervisory function in the recognition process by monitoring the results from the fast match, language model and detailed match of all candidate words in order to maintain context information, and then from the decoder to a language model 104. The language model uses word trigram (or triclass, for French) probabilities to assign a probability to each candidate word returned by the fast match, based on its context. The system combines the fast match score and the language model probabilities to obtain a more informed list of candidate words, this list then being directed to both the decoder and to then detailed match processor 106. An acoustic detailed match 106 is then performed on these candidate words in the detailed match processor. The detailed match (also described in U.S. Pat. No. 4,718,094) computes the acoustic likelihood of the candidate words in order to find the best candidate from the list of candidate words resulting from the fast match and language model steps. The language model probability and the detailed match acoustic likelihood value for candidate words are used to rank these possible extensions.

The language model processor outputs a list of candidate words, which is forwarded to the decoder 108. If a candidate word is a liaison acceptor, the decoder determines whether the preceding word was a liaison generator, and if so, which liaison phoneme. If the preceding word generated a liaison phoneme, then the decoder will create an extra baseform for the current candidate word by adding the appropriate phoneme in front of the current candidate baseform. Thus, two baseforms for that one word—one with and one without a phoneme as onset—are generated for that word by the decoder and sent to the detailed match processor. If the detailed match result for the current word having that liaison phoneme as its onset is highest, then this will be the recognition result for the current word. If the preceding word did not generate a liaison, liaison phonemes as onsets will not be considered.

The acoustic processor, fast match processor, language model, detailed match processor and decoder are each preferably implemented as software running on a general purpose computer.

Figure 4:
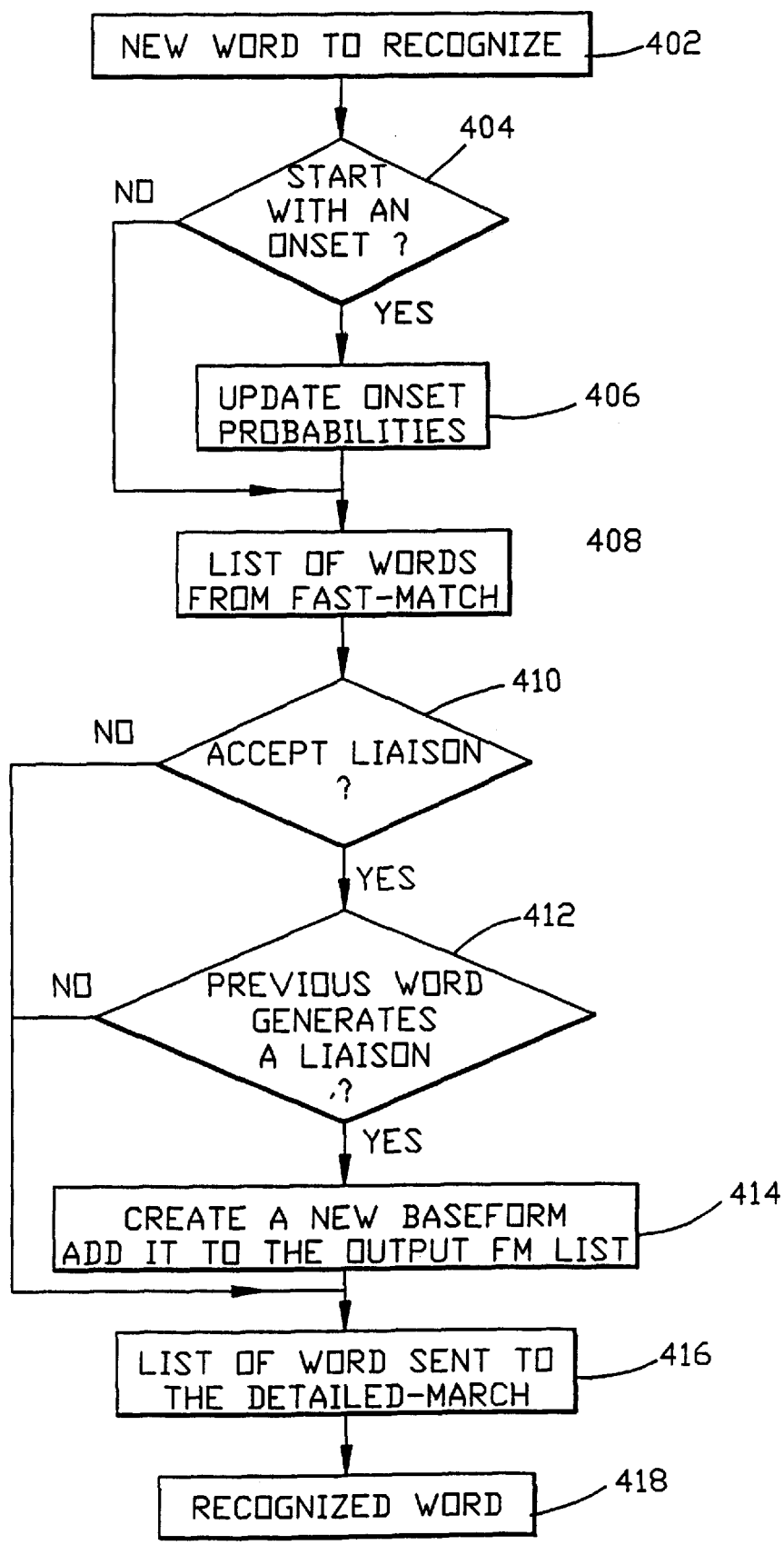
FIG. 4 is a flow diagram describing a method in accordance with the invention.

FIG. 4 is a flow diagram describing one embodiment of a recognition method in accordance with the invention. At step 402, a new word to be recognized is provided as input. At step 404, it is determined whether the input word begins with an onset. If not, a list of words is generated by means of a fast match procedure. If the input word does begin with an onset, the HMM for the word is updated to include a clink (which is described below) representing the various liaisons in the language which can replace the onset. Next, at step 408, a list of words is generated from the fast match. At step 410, the word under consideration is examined to determine whether it is a liaison acceptor. If so, at step 412 the preceding word is examined to determine whether it is a liaison generator. If so, at step 414 a new baseform is generated for the input word that includes the liaison phoneme at the beginning thereof, and the new baseform is added to the list of words sent to a detailed match, step 416. If either the word is not a liaison acceptor or the preceding word is not a liaison generator, the process proceeds to step 416, where a detailed match is performed on the results of the fast match and any new baseforms generated for liaison generator/acceptor pairs. At step 418, the recognized word is output.

Liaison Modeling for Fast-Match

In order to reduce computation cost and obtain a fast response time, the present invention uses a context independent clink to model liaisons at the fast match level. A clink is a machine constructed by using parallel Hidden Markov Models (HMMs). A clink is shown in FIG. 2 as modelling the transition between <silence> and the phoneme "A". It can be thought of as a "super" Hidden Markov Model which starts at the end of the silence HMM, and ends at the beginning of the HMM for "A". In accordance with a French-language embodiment of the invention, the phonetic baseforms of each word beginning with a vowel-like sound begins with a special Hidden Markov Model denoted "ONSET". As described above, during decoding, when the fast match tree is grown, every model ONSET is replaced with a clink which contains, in parallel, the current ONSET, and HMMs for all liaison phonemes in the language. In accordance with the model, if the input word to be recognized is pronounced without liaison, the ONSET will produce the highest probability. This probability is represented as follows:

Prob(ONSET)=Max Prob(L), where L={Z,N,R,T,P,G}

The members of L are phonemes. For example, if the word is pronounced with a Z-liaison, the Z-phoneme HMM will produce the highest probability.

Liaison Modelling for Detailed-Match

Before performing the detailed match, for each word in the candidate list which accepts liaisons, the method looks at the left context word. If the left context word is able to generate a liaison, an extra baseform for the current candidate word is created by adding the appropriate phoneme in front of the current candidate baseform. Thus, two baseforms for that word—one with and one without a phoneme as onset—are generated for that word by the decoder and sent to the detailed match processor.

Figure 3:
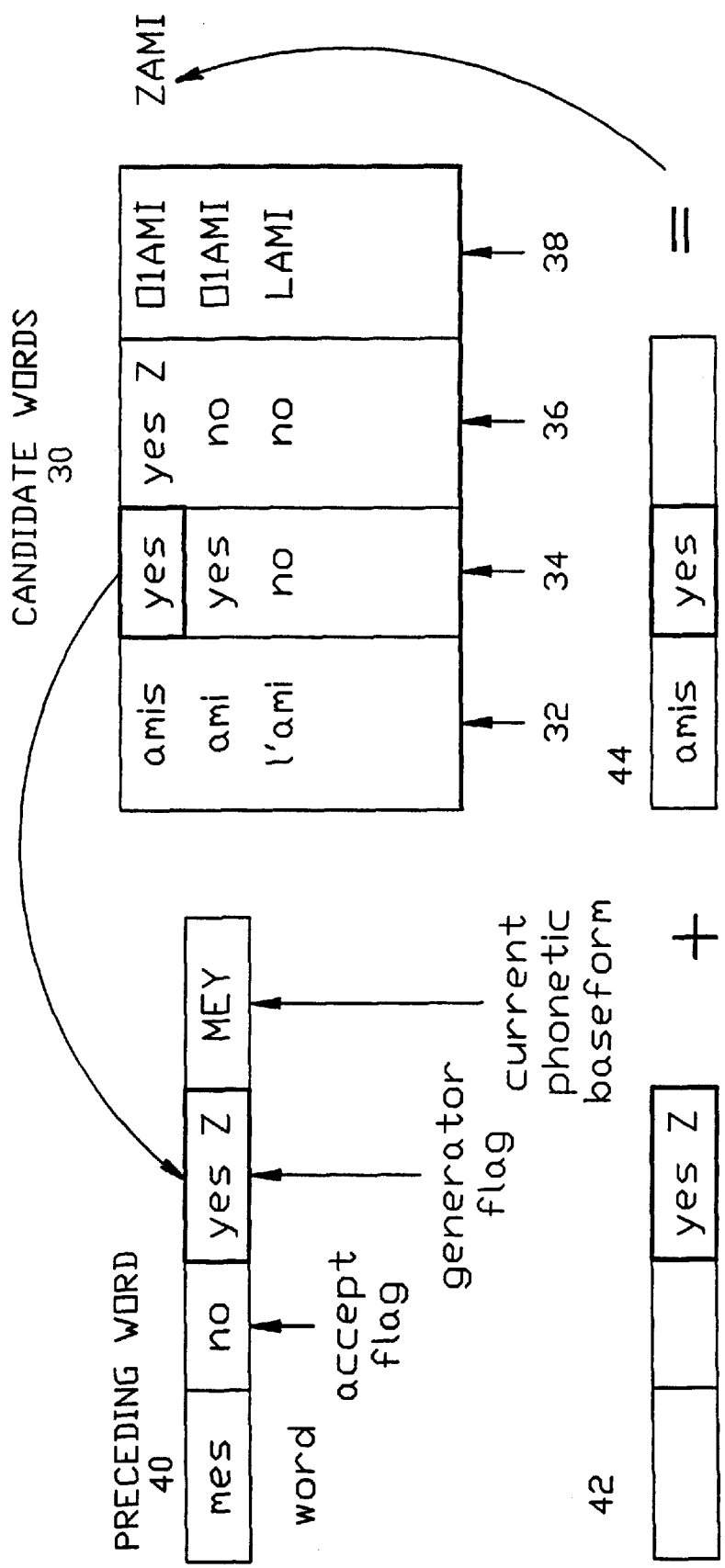
FIG. 3 is a detailed match modelling of the phrase "mes amis" in accordance with the invention.

In FIG. 3, a table 30 of candidate words output by the language model includes the following information In the first column 32 is a list of candidate words. The second column 34 indicates whether the candidate word is a liaison acceptor. The third column 36 indicates whether the word is a liaison generator, and if so, which liaison. The fourth column 38 shows the non-liaison phonetic pronunciation of the candidate word.

A second table 40 in FIG. 3 represents the previous word. The contents of the four columns are as described for table 30. In the example shown, the preceding word is not a liaison acceptor, but it is a generator of the liaison Z. Blocks 42 and 44 of FIG. 3 show how the information of tables 30 and 40 are combined to achieve a recognition result. The liaison Z generating status of block 42 is combined with the liaison accepting status of block 44 to result in a high recognition probability for the pronunciation "ZAMI".

Liaison and Other Steps

Training

Current systems employ a step in training during which it is decided which lexeme among several is used by a speaker. (For example, "the" can be pronounced as DHUH or DHEE.) To handle liaisons during training, the system and method of the present invention include extra baseforms for the training words which are likely to be pronounced with liaison. During training, the user is asked to read a given text. It is known before processing which words in the vocabulary are likely to be pronounced with liaison. By concatenating the liaison phone to the phonetic baseforms of this word, we obtain a set of extra phonetic baseforms able to handle liaisons at this place (for this word).

Add-Word and Word Verification

An addword feature allows the user to add new words to the dynamic vocabulary that were not included when the system was purchased. The add word function is performed by means of an add word tree, which is built without any liaison information. With respect to liaison, words to be added are treated as any dynamic vocabulary words, described above, wherein liaison information can be generated using the base rules.

Word verification is a feature which allows the user to add a new pronunciation of a known word (i.e., a new phonetic baseform) to the system. See L. Bahl, et al., "Automatic phonetic baseform determination", ICASSP 1991. As an example, an alternative pronunciation for the word tomato (tom^to; tomĀto) can be added by word verification.

Experimental Results

The results reported in Table 4 show the improvement obtained with liaison modelling in accordance with the invention. The first line refers to a 32K vocabulary isolated speech dictation task. The second line refers to a continuous speech numbers task. Both are tested with a speaker independent acoustic model.

While the invention has been described in particular with respect to preferred embodiments thereof, it will be understood that modifications to the disclosed embodiments can be effected without departing from the spirit and scope of the invention.

TABLE 1

| Ending graphic liaison generating consonants | Corresponding liaison phoneme | Example |
| --- | --- | --- |
| s, x, z | Z | as in "mes Zamis" |
| n | N | as in "un Nami" |
| r | R | as in "premier Rami" |
| t, d | T | as in "petit Tami" |
| p | P | as in "trop Pami" |
| g | G | as in "long Get difficile" |

TABLE 2

| IF a word ends with a non-pronounced graphic consonant x, where x∈{s, x, z, n, r, t, d, p, g,}, AND IF the following word starts with a vowel-like sound | → | THEN a liaison phoneme X, where X∈{Z, N, R, T, P, G}, can be inserted in front of the second word |
| --- | --- | --- |

TABLE 3

| | | | current word | | |
| --- | --- | --- | --- | --- | --- |
| | starting left word ending with | | | with a: | |
| left | | liaison | vowel- | | right word |
| left word | generating consonant | gram. class | like sound | gram. class | gram. class |
| C' | apres en | PREPOSITION | avoir | | |
| | tout | PINDMS* | | NOUN | |
| | est | AUXE** | | | |
| | LGC = s | ADVERB ADJECTIVE VERB NUMBER | et | PAUX*** ADJECTIVE | ADJECTIVE |

*indefinite pronoun singular masculine
**verb "to be" infinitive and past participle
***verb "to be"
(LGC = Liaison Generating Consonant)

TABLE 4

| % Error rate | Without liaison modelization | % cpu | with liaison modelization | % cpu |
| --- | --- | --- | --- | --- |
| Isolated speech | 9.61% | 35.8% | 5.80% | 36.4% |
| Continuous speech | 5.41% | 26.7% | 4.16% | 25.5% |

We claim:

1. A method for recognizing speech, comprising:
   providing a vocabulary of words for recognizing speech;
   inputting words to be recognized, including a current word to be recognized;

identifying liaisons by determining whether an immediately preceding word to the current word can generate a liaison, wherein a liaison generator is a word that ends with an unpronounced consonant phoneme when followed by a word beginning with a consonant phoneme, and ends with a pronounced phoneme when followed by a word with a beginning selected from the group consisting of a vowel and a vowel-like phoneme;

amending a match list, created from the vocabulary of words for identifying the current word, by adding words that represent a placement of liaisons at the beginning of the current word; and recognizing the current word by selecting words from the match list according to a ranked match of words in the match list including the words added that represent a placement of the liaisons at the beginning of the current word.

2. The method as recited in claim 1, wherein the step of identifying liaisons includes the step of formulating rules in accordance with a language to be recognized such that liaisons are identified in accordance with the rules.

3. The method as recited in claim 1, wherein the step of identifying liaisons includes the step of providing flags for words in the match list to assist in identifying liaisons between the current word and the immediately preceding word.

4. The method as recited in claim 1, further comprises the step of creating the match list by performing a fast match to determine candidate words for recognizing the current word.

5. The method as recited in claim 1, wherein the step of identifying liaisons includes the step of determining possible liaison acceptors and possible liaison generators based on a context of the current word and the immediately preceding word.

6. The method as recited in claim 5, further comprises the step of providing baseforms including liaison phonemes to words in the match list if a possible liaison exists based on the context of the current word and the immediately preceding word.

7. The method as recited in claim 1, wherein the step of recognizing the current word includes the step of performing a detailed match.

8. A program storage device readable by machine, tangibly embodying a program of instructions executable by the machine to perform method steps for recognizing speech including liaisons, the method steps comprising:

providing a vocabulary of words for recognizing speech;

inputting words to be recognized, including a current word to be recognized;

identifying liaisons by determining whether an immediately preceding word to the current word can generate a liaison, wherein a liaison generator is a word that ends with an unpronounced consonant phoneme when followed by a word beginning with a consonant phoneme, and ends with a pronounced phoneme when followed by a word with a beginning selected from the group consisting of a vowel and a vowel-like phoneme;

amending a match list, created from the vocabulary of words for identifying the current word, by adding words that represent a placement of the liaisons at the beginning of the current word; and recognizing the current word by selecting words from the match list according to a ranked match of words in the match list including the words added that represent a placement of the liaisons at the beginning of the current word.

9. The program storage device as recited in claim 8, wherein the step of identifying liaisons includes the step of formulating rules in accordance with a language to be recognized such that liaisons are identified in accordance with the rules.

10. The program storage device as recited in claim 8, wherein the step of identifying liaisons includes the step of providing flags for words in the match list to assist in identifying liaisons between the current word and the immediately preceding word.

11. The program storage device as recited in claim 8, further comprises the step of creating the match list by performing a fast match to determine candidate words for recognizing the current word.

12. The program storage device as recited in claim 8, wherein the step of identifying liaisons includes the step of determining possible liaison acceptors and possible liaison generators based on a context of the current word and the immediately preceding word.

13. The program storage device as recited in claim 12, further comprises the step of providing baseforms including liaison phonemes to words in the match list if a possible liaison exists based on the context of the current word and the immediately preceding word.

14. The program storage device as recited in claim 8, wherein the step of recognizing the current word includes the step of performing a detailed match.

* * * * *